March 14, 1961  B. I. SANDOR  2,975,003
VEHICLE BRAKING SYSTEM
Filed Feb. 6, 1959  2 Sheets-Sheet 1

INVENTOR.
BELA I. SANDOR
BY
McMorrow, Berman & Davidson
ATTORNEYS

March 14, 1961  B. I. SANDOR  2,975,003
VEHICLE BRAKING SYSTEM
Filed Feb. 6, 1959  2 Sheets-Sheet 2
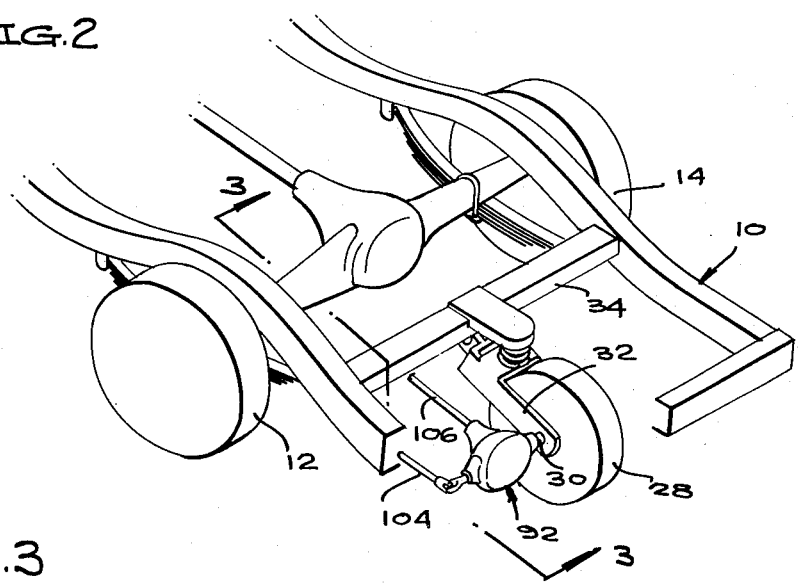
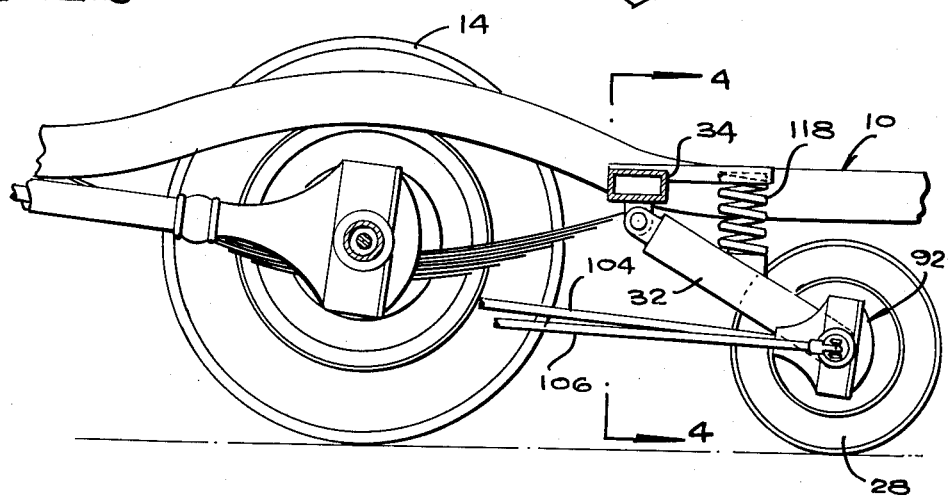
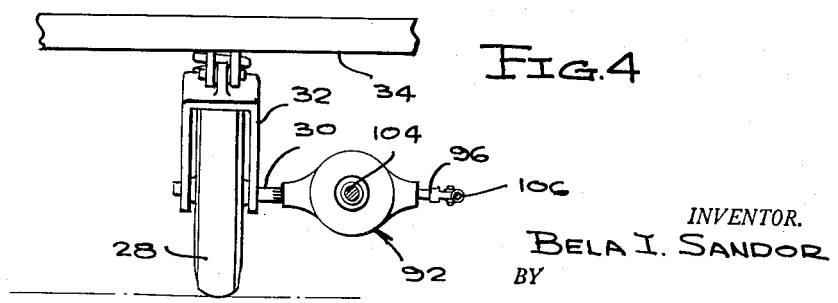
INVENTOR.
BELA I. SANDOR
BY
McMorrow, Berman & Davidson
ATTORNEYS

United States Patent Office 2,975,003
Patented Mar. 14, 1961

2,975,003

VEHICLE BRAKING SYSTEM

Bela I. Sandor, 501 E. Daniel St., Champaign, Ill.

Filed Feb. 6, 1959, Ser. No. 791,741

3 Claims. (Cl. 303—21)

The present invention relates to a vehicle braking system generally and in particular to a nonskid braking system.

In automotive vehicles presently in use, the brake systems employed permit the locking of the braked wheels by the application of a sufficient pressure to the piston of the brake master cylinder. Various means have been proposed to prevent the locking of the wheels but for the reason that locked wheels frequently cause side skidding with many accidents resulting. Also, skidding of the wheels wears rubber from the tires and fails to slow the vehicle as efficiently as when the brakes are applied with the greatest pressure possible without skidding.

An object of the present invention is to provide a vehicle braking system having self-operating means for preventing the addition of further brake pressure applied to the vehicle wheels upon the application of pressure to the wheels sufficient to lock the wheels against rotation.

Another object of the present invention is to provide a vehicle braking system having self-operating means for partially releasing the brake pressure applied to the vehicle wheels upon the application of pressure to the vehicle wheels sufficient to lock the wheels against rotation.

A further object of the present invention is to provide a vehicle braking system which is automatic in operation upon the application of pressure to the wheels sufficient to lock the wheels against rotation and which permits the application of pressure to the wheels so that optimum braking performance is obtained without skidding of the wheels and during the entire interval of deceleration of the vehicle.

A still further object of the present invention is to provide a vehicle braking system which may be incorporated in any vehicle having hydraulic brakes, one which is simple in construction and economically feasible, and one which is highly effective in action.

These and other objects and advantages of the present invention will be fully apparent from the following description when taken in conjunction with the annexed drawings, in which:

Figure 2 is an isometric view of the rear end portion of a vehicle frame showing a portion of the system of the present invention carried thereby;

Figure 3 is a view on an enlarged scale, taken on the line 3—3 of Figure 2; and

Figure 4 is a view taken on the line 4—4 of Figure 3.

Figure 1:
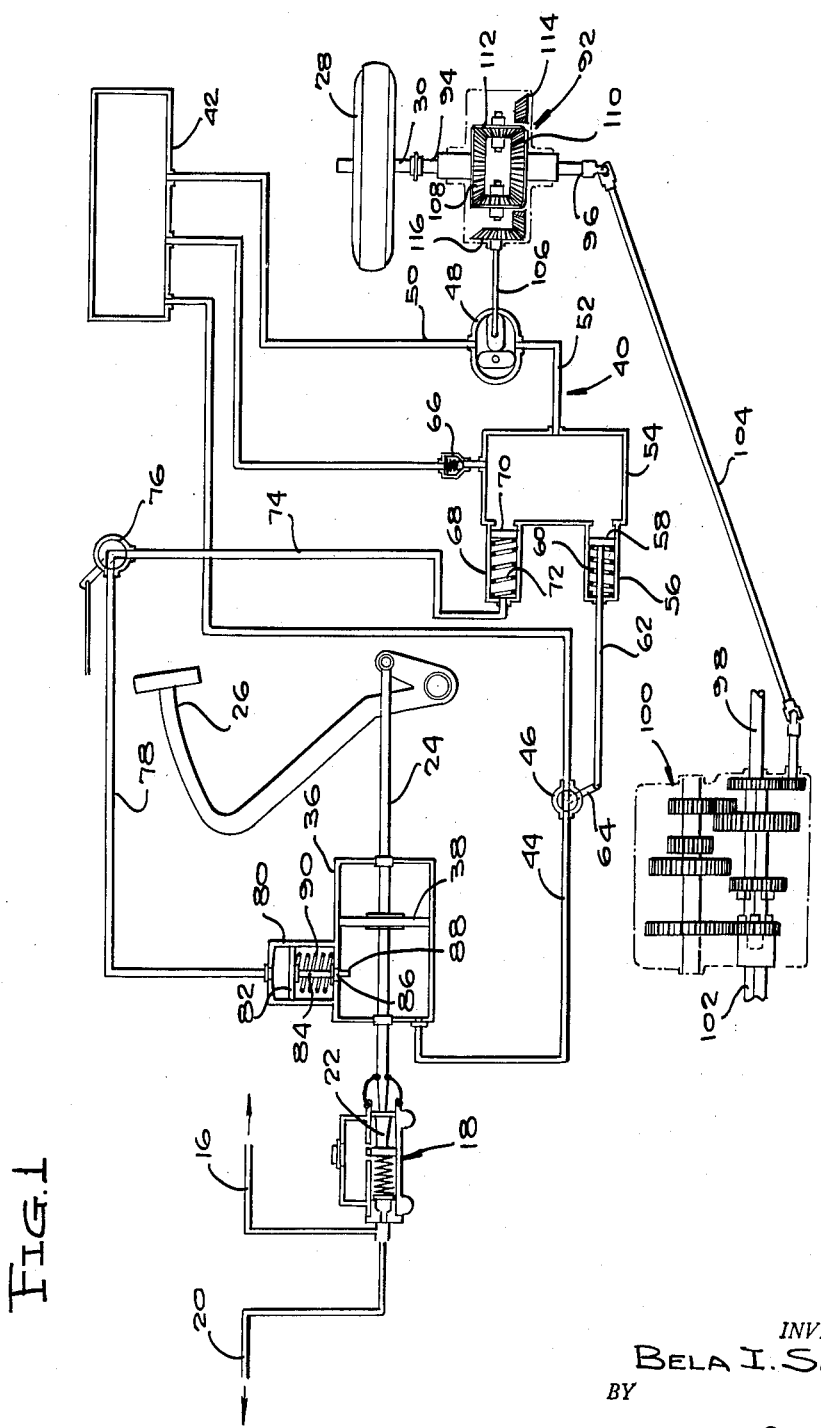
Figure 1 is a schematic view of the braking system according to the present invention with parts shown in section.

Referring in greater detail to the drawings in which like numerals indicate like parts throughout the several views, the vehicle brake system according to the present invention comprises, in combination, a vehicle frame, the rear end portion of which is shown in Figure 2 and designated by the reference numeral 10, and wheels 12 and 14 supporting the rearward end portion of the frame 10. The wheels 12 and 14 have conventional hydraulic brake actuating mechanisms supplied with hydraulic fluid under pressure by a conduit 16 (Figure 1) connecting the mechanisms to a master cylinder 18. Another conduit 20 connects the master cylinder 18 to other hydraulic brake mechanisms in the front wheels of the vehicle, the latter not being shown for reasons of simplification.

The piston 22 of the master cylinder 18 is on one end of a reciprocatory brake actuating member 24. The other end of the actuating member 24 is operatively connected to the brake pedal 26 of the vehicle. Movement of the actuating member 24 to the left in Figure 1 effects the application of braking pressure to the wheels 12 and 14 and to the front wheels of the vehicle.

A rotatable wheel 28, rollably engaging a ground surface, is dependingly carried by the frame 10 rearwardly of and between the wheels 12 and 14. The wheel 28 is mounted upon a horizontally disposed shaft 30 which is journaled for rotation in the lower end of an upwardly sloping fork member 32 which has its upper end pivotally connected for swinging movement about a horizontal axis to a cross member 34 of the frame 10.

A closed cylinder 36 is circumposed about the actuating member 24 and a first piston 38 is mounted on the actuating member 24 and is slidable within the cylinder 36 for movement with the actuating member 24, as shown in Figure 1.

Self-operating means, designated generally by the reference numeral 40, is operated by the wheel 28 and operates upon the application of braking pressure to the wheels 12 and 14 sufficient to lock the wheels 12 and 14 against rotation to lock the piston 38 against movement and also to shift the actuating member 24 and attached piston 38 in a direction to partially release the braking pressure on the vehicle wheels 12 and 14. Specifically, the means to lock the piston 38 within the cylinder 36 and to thereby resist the further application of braking pressure to the piston 22 of the master cylinder 18, consists in conduit means connecting one end of the cylinder 36 with a reservoir 42 which is filled with a hydraulic fluid, this conduit means including a conduit 44 having a normally open valve 46. The conduit 44 has one end connected to the end of the cylinder 36 adjacent the master cylinder 18 and has its other end connected to the reservoir 42.

A pump 48 has its inlet side connected by a first conduit 50 to the reservoir 42 and its outlet side connected by a second conduit 52 to a fluid pressure chamber 54. A piston chamber 56, having one end closed and one end open, has its one end opening into the fluid pressure chamber 54 and has slidable therein a second piston 58 biased toward the fluid pressure chamber 54 by means of a coil spring 60. The spring 60 is circumposed about a portion of an actuating rod 62 which has the adjacent end fastened to the piston 58 and the other end pivotally connected to the valve operating arm 64 of the valve 46 in the conduit 44.

Upon actuation of the pump 48, fluid under pressure is pumped to the fluid pressure chamber 54 and effects the movement of the piston 58 to close the normally open valve 46. A relief valve assembly 66 maintains the pressure within the fluid pressure chamber 54 within prescribed limits.

The means for imposing pressure to one side of the piston 38 of a magnitude such as to shift the actuating member 24 in a direction to partially release the braking pressure on the vehicle wheels 12 and 14 includes a pressure chamber 68 having one end closed and the other end open connected by its open end to the fluid pressure chamber 54. A third piston 70 is slidable within the chamber 68 and is biased toward the fluid pressure chamber 54 by means of a coil spring 72 within the pressure chamber 68. A conduit 74 connects the closed end of the pressure chamber 68 with a hand actuable valve 76. One side of the valve 76 is connected by a conduit 78 to the closed end of a piston chamber 80 in which is slidably mounted a fourth piston 82. The piston 82 is mounted upon one end of a plunger 84 which has the portion adjacent its other end projecting through a seal 86 into the cylinder 36 at the end thereof remote from the brake pedal 26. A projecting end portion of the plunger 84 is designated by the numeral 88 in Figure 1. A coil spring 90 is interposed between the piston 82 and the wall of the cylinder 36 and biases the piston 82 to the position in which the plunger projecting portion 88 is withdrawn from the cylinder 36.

In Figure 1, a conventional differential assembly 92 is shown diagrammatically with the normal output shafts 94 and 96 thereof operatively connected to the shaft 30 of the rollable wheel 28 and to the drive shaft 98 of the vehicle, respectively. The wheels 12 and 14 are driven by the drive shaft 98 by conventional means not here illustrated. The reference numeral 100 designates generally the transmission of the vehicle with the input shaft 102 extending into one end and the drive shaft 98 extending out of the other end. Suitable drive means 104, here shown schematically, connects the differential output shaft 96 to the drive shaft 98. The normal input shaft 106 of the differential assembly 92 is operatively connected to the pump 48 for the actuation of the latter.

The adjacent ends of the differential output shafts 94 and 96 carry bevel gears 108 and 110 within the differential assembly 92 and the gears 108 and 110 are interconnected together by planetary gears 112, in the conventional manner. The planetary gears 112 are mounted upon a ring gear 114 which drives a bevel gear 116 mounted upon the adjacent end of the differential input shaft 106.

In operation, the rollable wheel 28 is biased into its ground engaging position by a spring 118 interposed between the fork member 32 and the adjacent portion of the frame 10.

With the vehicle frame 10 in forward movement, the wheel 28 rotates at the same speed as the wheels 12 and 14. The drive means 104 is geared to the drive shaft 98 so that the shaft 96 rotates at the same speed as the shaft 94 although in opposite directions. The rotation of the bevel gears 108 and 110 in opposite directions and at the same speeds does not impart rotation to the ring gear 114 or rotation to the bevel gear 116 on the attached shaft 106. Therefore, from zero speed to the top speed of the vehicle, the pump 48 is inoperative. Upon the application of pressure to the brake pedal 46 and braking pressure through the conduits 16 and 20 to the brake mechanisms of the wheels of the vehicle, the vehicle is caused to decelerate and upon application of sufficient pressure to the brake mechanisms to cause the wheels of the vehicle to lock, the bevel gear 110 is locked against rotation which effects the rotation of the ring gear 114 and rotation of the shaft 106 to drive the pump 48. The pump 48 increases the fluid pressure within the fluid pressure chamber 54 to effect the shifting of the piston 58 in its piston chamber 56 and close the valve 46. The one end portion of the cylinder 36 adjacent the master cylinder 18 is completely filled with hydraulic fluid from the reservoir 42 and upon closing of the valve 46 this fluid within the one end portion of the cylinder 36 locks the piston 38 from movement toward the master cylinder 18 so that no more brake pressure may be applied to the wheels 12 and 14.

With the valve 76 in open position connecting the pressure chamber 68 with the piston chamber 80, pressure within the fluid pressure chamber 54 now acts on the piston 70 to drive fluid within the conduit 74 and conduit 78 into the piston chamber 80 to shift the piston 82 to the position in which the projecting end portion 88 of the plunger 84 extends into the one end portion of the cylinder 36. This results in the application of an increased pressure to the piston 38 and causes the actuating member 24 to shift to the right in Figure 1, relieving the pressure on the master cylinder piston 22 and releasing or partially releasing the locked brakes in the wheels 12 and 14.

The hand actuable valve 76 provides a means for selectively keeping inoperative or making operative the means for shifting the piston 38 in the direction within the cylinder 36 away from the master cylinder 18 to relieve the pressure within the master cylinder 18.

It will be seen therefore that as the vehicle moves forwardly and the brakes are applied to the point that the brakes are locked and the wheels skid, the braking system according to the present invention provides a means which instantly unlocks the skidding wheels and permits rotation with the maximum amount of brake pressure applied to the brakes without skidding.

What is claimed is:

1. The combination with a vehicle frame including a drive shaft, and vehicle wheels to be braked drivingly connected to said drive shaft, of a reciprocatory actuating member operatively connected to said wheels for applying brake pressure to said wheels, a rotatable wheel rollably engaging a ground surface and carried by said frame, a differential assembly including a first output shaft operatively connected to said rotatable wheel, a second output shaft operatively connected to said drive shaft, and an input shaft, a piston connected to said actuating member for movement therewith, a fixed closed cylinder enclosing said piston, a reservoir filled with a hydraulic fluid, conduit means connecting said reservoir to one end of said cylinder, a normally open control valve in said conduit, and self-operating means operated by said rotatable wheel and including a pump operatively connected to said input shaft and having an inlet side connected to said reservoir and having an outlet side operatively connected to said valve, said means operating upon application of braking pressure to the vehicle wheels sufficient to lock the wheels against rotation to shift said valve to closed position and lock said piston against movement in one direction.

2. The combination with a vehicle frame including a drive shaft, and vehicle wheels to be braked drivingly connected to said drive shaft, of a reciprocatory actuating member operatively connected to said wheels for applying brake pressure to said wheels, a rotatable wheel rollably engaging a ground surface and carried by said frame, a differential assembly including a first output shaft operatively connected to said rotatable wheel, a second output shaft operatively connected to the said drive shaft, and an input shaft, a first piston connected to said actuating member for movement therewith, a fixed closed cylinder enclosing said piston, a reservoir filled with a hydraulic fluid, conduit means connecting said reservoir to one end of said cylinder, a normally open control valve in said conduit, and self-operating means operated by said rotatable wheel and including a pump operatively connected to said input shaft and having an inlet side and an outlet side, the first conduit connecting the inlet side of said pump to said reservoir, a fluid pressure chamber, a second conduit connecting the outlet side of said pump to said pressure chamber, a piston chamber opening into said pressure chamber, a second piston working within said piston chamber, and an actuating rod carried by said piston and connected to said valve, said means operating upon application of braking pressure to the vehicle wheels sufficient to lock the wheels against rotation to shift said valve to closed position and lock said first piston against movement in one direction.

3. The combination with a vehicle wheel including a drive shaft, and vehicle wheels to be braked drivingly connected to said drive shaft, of a reciprocatory actuating member operatively connected to said wheels for applying brake pressure to said wheels, a rotatable wheel rollably engaging a ground surface and carried by said frame, a differential assembly including a first output shaft operatively connected to said rotatable wheel, a second output shaft operatively connected to said drive shaft, and an input shaft, a first piston connected to said actuating member for movement therewith, a fixed closed cylinder enclosing said piston, a reservoir filled with a hydraulic fluid, conduit means connecting said reservoir to one end of said cylinder, a normally open control valve in said conduit, and self-operating means operated by said rotatable wheel and including a pump operatively connected to said input shaft and having an inlet side and an outlet side, a first conduit connecting the inlet side of said pump to said reservoir, a fluid pressure chamber, a second conduit connecting the outlet side of said pump to said pressure chamber, a piston chamber opening into said pressure chamber, a second piston working within said piston chamber, an actuating rod carried by said piston and connected to said valve, said means operating upon application of braking pressure to the vehicle wheels sufficient to lock the wheels against rotation to shift said valve to closed position and lock said first piston against movement toward one end of said cylinder, fluid pressure means operatively connected to said fluid pressure chamber and to the portion of said closed cylinder adjacent said one end and operable to increase the pressure within the portion of said cylinder adjacent said one end and shift said first piston in a direction to partially release the braking pressure on said vehicle wheels.

References Cited in the file of this patent

UNITED STATES PATENTS

| | | |
|---|---|---|
| 2,736,395 | Keeler | Feb. 28, 1956 |
| 2,868,338 | Lucien et al. | Jan. 13, 1959 |

FOREIGN PATENTS

| | | |
|---|---|---|
| 656,203 | Great Britain | Aug. 15, 1951 |